UNITED STATES PATENT OFFICE.

JAMES TAYLOR CARRICK, OF JOHANNESBURG, TRANSVAAL, ASSIGNOR OF ONE-HALF TO STUART PATTISON, OF JOHANNESBURG, TRANSVAAL.

WET TREATMENT OF MATTES.

961,934. Specification of Letters Patent. Patented June 21, 1910.

No Drawing. Application filed November 13, 1908. Serial No. 462,444.

*To all whom it may concern:*

Be it known that I, JAMES TAYLOR CARRICK, a subject of the King of Great Britain and Ireland, and residing at New Club, Johannesburg, Transvaal, have invented certain new and useful Improvements in and Relating to the Wet Treatment of Mattes, of which the following is a specification.

This invention relates to the wet treatment of mattes containing metals of the copper, iron or nickel groups.

By metals of the copper group it is to be understood that those metals which form sulfids insoluble in dilute hydrochloric acid are intended; of the iron group, those which are precipitated by excess of ammonia (in presence of ammonium chlorid); of the nickel group those which are not precipitated by ammonia (in the presence of ammonium chlorid, and the terms copper, iron and nickel used in the specification refer to these groups. In treating such mattes by certain wet processes several steps are taken which lead to waste of material, for example in some, the matte is first dissolved in sulfuric acid, calcium chlorid is added to the sulfate solution at various stages of the process while metals such as nickel and iron are still present. This is found by the present inventor to be had, firstly, because the calcium sulfate formed is not sufficiently insoluble in the dilute hydrochloric acid also formed, and secondly, because it is very difficult to wash the calcium sulfate free of such metallic salts. In the precipitation of the iron, where such has been desired to be recovered as ferric oxid, chlorin has usually been used for oxidizing previous to precipitation. This is expensive.

It has also heretofore been proposed to obtain or recover from ferrous solutions, what has been described as a complex product or pigment made up of precipitated black magnetic ferroferric oxid, by taking a rather dilute solution of a ferrous salt, and completely precipitating this in the cold by carbonate of soda added in slight excess, or by caustic soda or some other soluble hydroxid or carbonate.

According to the process last referred to, immediately after the addition of the precipitating agent has been begun heat is supplied and a rapid current of air introduced to stir up the liquid and the precipitate most energetically. The heat is so regulated that the temperature quickly rises to between 80° C., and 90° C. Under these conditions it has been stated that the precipitated ferrous carbonate or hydroxid is very rapidly oxidized. The operation is terminated by bringing the liquid, after the air has been shut off, to the boiling point and maintaining it for a few minutes at that temperature. In order to determine when the admission of air should be discontinued, it was suggested that the product should be analyzed at various stages of the process, or judged by appearance in conjunction with the analysis in order to fix this point with reasonable certainty, the operation being interrupted before the final sample is analyzed.

The present inventor has experimented with this process and found that it is utterly unworkable when ammonium hydroxid is used as an alkali.

According to the present invention which has for its purpose the separation of the metals of the copper iron and nickel groups, it is necessary to use an ammoniacal body and no other alkali, especially when nickel is present, because in that case ammonia in excess forms a soluble double salt with nickel while iron is precipitated. It is also desirable to use a normal temperature solution, as ammonia is volatile and only economically recoverable in towers or the like which are expensive to construct. Unnecessary volatilization of ammonia is therefore to be avoided as otherwise excessive expense for towers is incurred. It is found that the ammonia must be used in large excess equal to about twice the equivalent quantity required to neutralize all the acid present, whether combined or uncombined as otherwise the reaction obtained according to the present invention remains incomplete.

According to the prior process described above, ammonia cannot be used, as the temperature of working is between 80° C. and 90° C., at which temperature it is found by the present inventor to be utterly impossible to obtain the desired result, according to the present invention, with ammonia present, at that temperature an agglomerated mixture of ferrous and ferric compounds is obtained which will not yield a homogeneous black precipitate.

Further according to the hereinafter described process it is unnecessary continually to be taking samples while aspirating the solution as it is found that so long as a large excess of ammonia is present and the temperature is not raised the ferro-ferric precipitate will not lose its dense black color.

According to one experiment, air was passed through the strongly ammoniacal liquor continuously for three days at ordinary temperature without changing the black ferroferric product which had been produced at the end of the first day.

The object of the invention is to obtain a process free of the disadvantages referred to above, as being incidental to prior processes whereby practically the whole of the constituents of the matte and reagents used are preserved and economical separation and recovery of the metals of the copper, iron and nickel groups are effected.

The invention consists in a complete process for the wet treatment of mattes such as those referred to above in which there is no substantial waste of material.

The invention also consists in a process for the wet treatment of mattes in which substantially the whole of the hydrochloric acid used is recovered in a pure form and in a highly economic manner.

The invention also consists in the processes hereinafter described.

In carrying the invention into effect in one form, copper nickel matte sufficiently rich in iron sulfid to be soluble is treated with hydrochloric acid until evolution of sulfureted hydrogen substantially ceases. After this stage is reached hydrogen sulfid is passed through the mass, and the whole allowed to cool and to stand in order that any copper or any other metals, whose sulfids are precipitated in dilute hydrochloric acid solutions by sulfureted hydrogen, which may have been dissolved shall be precipitated. The mixture is then filtered. The residue now consists substantially of cuprous sulfid together with any insoluble matter, such as insoluble aluminates, silicates or precious metals, and may be treated in any desired manner. The filtrate is substantially a chlorid solution of the metals of the iron and nickel groups. To this filtrate ammonium hydroxid or ammonium carbonate is added in large excess, say twice the equivalent quantity required to neutralize the hydrochloric acid used. Air is then aspirated through the mixture for about 24 hours at ordinary temperature whereby a black magnetic ferroferric precipitate is obtained which is much more insoluble in hydrochloric acid than freshly precipitated ferric hydrate. This precipitate contains a small quantity of nickel, which has been found to be in certain cases about 3%, and which nickel cannot be removed by ordinary washing or washing with cold ammonium chlorid solutions. This ferroferric compound is removed from the solution by an electromagnet, or by filtration and then washed. It is then treated with dilute acid, preferably hydrochloric acid in the cold, for example in a rotating cylinder. In place of hydrochloric acid, acetic acid or a body which liberates acid such as ammonium chlorid when boiled, will also effect the same purpose to a greater or less extent. The acid is preferably not greater than 5% strength and may be in practice about 2% if desired, the purpose being to dissolve the nickel and to prevent excess of the much more insoluble ferroferric compound going into solution. The result of this, after washing the precipitate free from acid, is substantially a nickel free ferroferric precipitate. The acid used in this washing—from which the nickel need not at this stage be recovered—is added to the acid used to act in the first matte digestion process for a subsequent operation. The ammoniacal nickel filtrate is then boiled in the presence of excess of lime until the nickel is precipitated as hydroxid and substantially the whole of the ammonia is given off and recovered as ammonium hydroxid in towers or the like, the last trace being if desired, recovered by being passed through acid. The ammonia free solution is then evaporated, if desired to dryness for the recovery of water free from solid impurity. The calcium chlorid produced by the action of lime on the nickel and ammonium chlorids is then separated from the precipitated nickel hydroxids or oxids by filtration or leaching out of the dried mass.

The evaporation of the mixture of nickel hydroxid and calcium chlorid above referred to may be effected in an ordinary iron multiple evaporator, as the solution is necessarily alkali and the water free from solid impurity so recovered may be used for making up fresh quantities of acid solution for the digestion of the matte.

The calcium chlorid solution formed by the reaction between the metal and ammonium salts and the lime, after being filtered off or leached out is treated with sulfuric acid in slight excess, and from the mixture of calcium sulfate, free sulfuric acid and hydrochloric acid so produced, water and hydrochloric acid are evaporated by heating the mixture to about 130° C., by or while drawing air over it. It is found that by this means no trace of hydrochloric acid remains with the slightly acid residual hydrated calcium sulfate when tested with silver nitrate solution. The temperature of 130° C. referred to is below that at which calcium sulfate dehydrates, and above that at which hydrochloric acid evaporates at normal pressure, but other temperatures between the corresponding limits may be used with reduced pressure.

By this process a nickel compound such as the hydrate or oxid or a mixture of both is obtained which is found to have suitable physical properties as regards washing and the like, and which may be finally incinerated for the production of nickel oxid.

It will be observed that in this process the iron in the matte, which is usually eliminated as slag of little or no value, is recovered as a valuable by-product; the hydrochloric acid and ammonia used are continually recovered for fresh use, subject to losses caused by leakage or the like; the sulfuric acid and lime are recovered together as another valuable by-product, hydrated sulfate of calcium, commonly known as terre alba or pearl hardeners; and the water used is also recovered free from solid impurities to be used over again in a fresh cycle.

Having now described my invention what I claim as new and desire to secure by Letters Patent is:—

1. A wet process for the treatment of mattes containing metals of the copper, iron and nickel groups, without substantial waste, consisting in digesting the matte with a mineral acid, precipitating any copper dissolved, separating the liquid from the solid residue, treating the iron and nickel solution with large excess of ammonia, aspirating air through this solution for the production of a ferroferric precipitate, recovering residual nickel as a solution from this precipitate by treatment of the precipitate with dilute mineral acid in the cold, and returning this acid nickel solution to the first digesting solution for a subsequent operation, adding lime to the ammoniacal nickel solution, boiling the nickel and lime mixture, recovering the ammonia expelled by such boiling, removing any calcium chlorid present, treating the recovered calcium chlorid with sulfuric acid for the production of calcium sulfate, recovering the hydrochloric acid evolved, and recovering the nickel as set forth.

2. A wet process for the treatment of mattes containing metals of the copper, iron and nickel groups without substantial waste which consists in digesting the mattes in hydrochloric acid, separating the iron from the solution so formed, precipitating the nickel with lime, separating the calcium chlorid solution, treating the same with sulfuric acid whereby hydrochloric acid is set free and calcium sulfate precipitated, and evaporating such hydrochloric acid under conditions of temperature and pressure such as not to dehydrate the calcium sulfate.

3. A wet process for the treatment of mattes containing metals of the copper iron and nickel groups consisting in digesting the matte with a mineral acid, treating the filtrate with a large excess of ammonia and aspirating air through the mixture for the production of a ferro-ferric compound, as set forth.

4. A wet process for the treatment of mattes containing metals of the copper iron and nickel groups consisting in digesting the matte with a mineral acid, treating the filtrate with a large excess of ammonia in the cold, aspirating air through the mixture for the production of a ferro-ferric precipitate, treating this precipitate with dilute acid and treating the nickel filtrates for the recovery of nickel as set forth.

In testimony whereof I have signed my name to this specification in the presence of two subscribing witnesses.

JAMES TAYLOR CARRICK.

Witnesses:
  PERCY RAYNER-SMITH,
  BERTRAM HARRY MATTHEWS.